United States Patent [19]

Adams

[11] 4,285,440
[45] Aug. 25, 1981

[54] SPILL AND SPIT RESISTANT FUEL CAP

[75] Inventor: Gar M. Adams, Elkhart Lake, Wis.

[73] Assignee: Tecumseh Products Company, Tecumseh, Mich.

[21] Appl. No.: 28,714

[22] Filed: Apr. 9, 1979

[51] Int. Cl.³ .............................................. B65D 51/16
[52] U.S. Cl. ..................................... 220/202; 137/43; 220/303; 220/374
[58] Field of Search ............................ 137/43, 519.5; 220/202-204, 303, 373, 374, DIG. 33, 367

[56] References Cited

U.S. PATENT DOCUMENTS

| 1,339,485 | 5/1920 | Stranahan | 220/374 X |
| 1,850,730 | 3/1932 | Seiss | 220/303 X |
| 1,859,479 | 5/1932 | Thwaits | 137/43 |
| 1,893,942 | 1/1933 | Jensen | 137/43 |
| 2,730,264 | 1/1956 | Strasel | 220/374 |
| 2,800,245 | 7/1957 | Doyle et al. | 220/373 |
| 2,849,147 | 8/1958 | Thompson | 220/374 |
| 3,064,668 | 11/1962 | Alkire et al. | 137/43 |
| 3,140,794 | 7/1964 | Arndt et al. | 220/374 X |
| 3,302,658 | 2/1967 | De Frees | 137/43 |
| 3,415,410 | 12/1968 | Franchini | 220/203 |
| 3,938,692 | 2/1976 | Crute | 220/203 |
| 3,974,936 | 8/1976 | Gerdes | 220/204 |
| 3,985,260 | 10/1976 | Evans | 220/203 |
| 4,165,816 | 8/1979 | Tapper | 220/373 X |

FOREIGN PATENT DOCUMENTS

| 2758432 | 7/1978 | Fed. Rep. of Germany | 220/203 |
| 886998 | 10/1943 | France | 220/203 |
| 281391 | 1/1931 | Italy | 220/374 |
| 1907 | of 1908 | United Kingdom | 220/202 |
| 662516 | 12/1951 | United Kingdom | 220/303 |

Primary Examiner—Allan N. Shoap
Attorney, Agent, or Firm—Albert L. Jeffers; Roger M. Rickert

[57] ABSTRACT

A vented fuel reservoir filler cap having a check valve positioned intermediate an inner surface of that cap and an annular gasket seated in the cap so that both the gasket and check valve will in turn be captured between the cap inner surface and the fuel reservoir filler when the cap is in the reservoir closing position is disclosed with the check valve comprising a disc-like support with an elongated valve cavity carried by the support and having openings near opposite ends thereof with a valve member captive within the valve cavity and movable between a position near one cavity end for closing the valve and a position near the other cavity end allowing the valve to remain open. The spit resistant characteristics of the cap are enhanced by providing a baffle intermediate the check valve and an aperture in the fuel cap for venting the reservoir and may be further enhanced by providing another baffle on the side of the check valve opposite the first baffle. Inadvertent inversion of the reservoir allows the valve member to move into a valve closing position minimizing leakage from the cap aperture.

6 Claims, 4 Drawing Figures

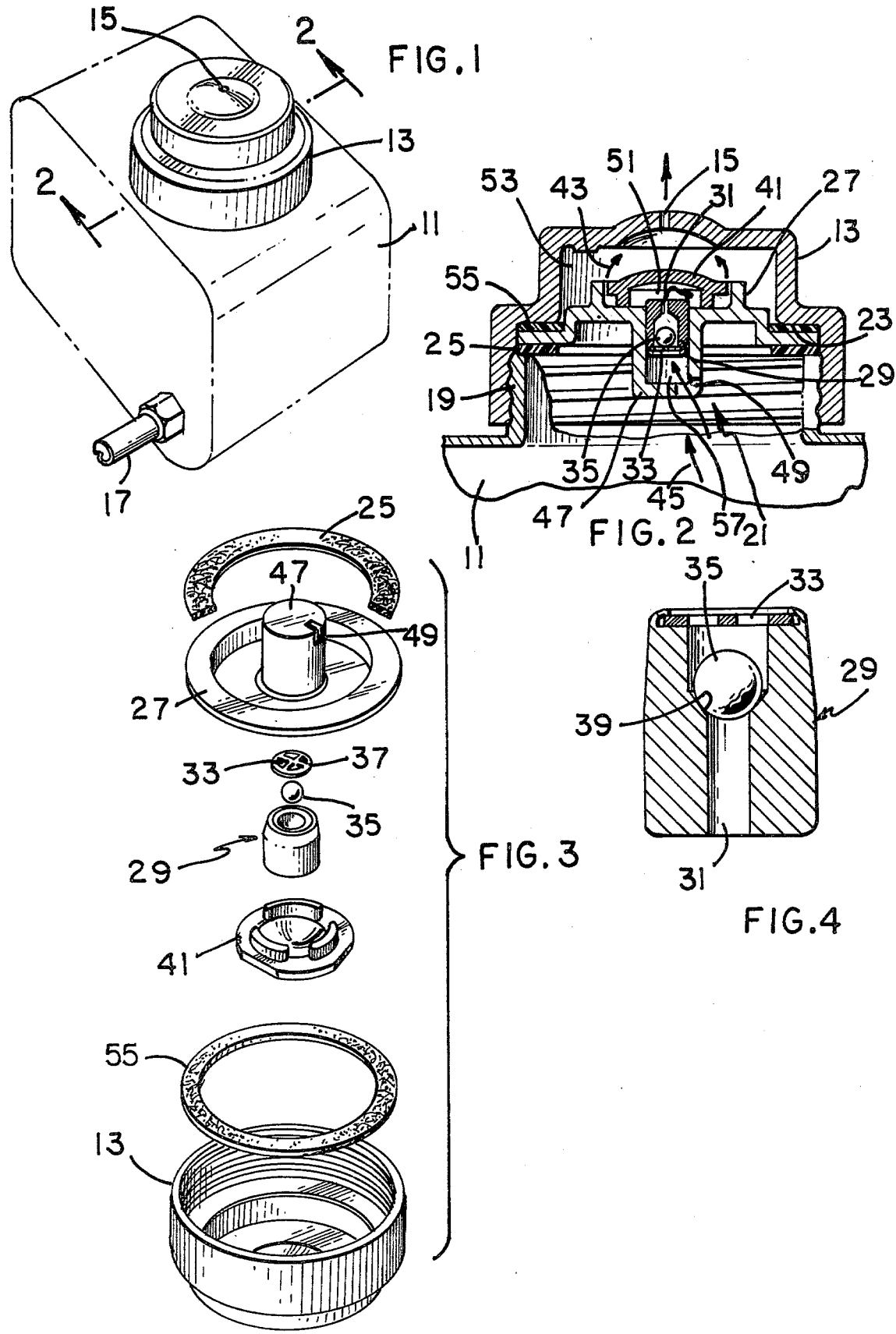

SPILL AND SPIT RESISTANT FUEL CAP

BACKGROUND OF THE INVENTION

The present invention relates generally to closure arrangements for containers and more particularly to a closure or cap arrangement for a fuel container which provides venting to the fuel reservoir while reducing fuel expulsion from the reservoir by way of that venting arrangement.

When fuel is drained from a fuel reservoir, the fuel volume within that reservoir diminishes and unless another medium, such as air is supplied to the reservoir to occupy the vacated space, the supply of fuel is inhibited or in some cases collapsing of the reservoir occurs. For example, with a small fuel tank as might be found on a gasoline powered lawnmower, snowblower, or the like, the fuel tank screw-on filler cap is typically provided with a small aperture for venting the tank to allow air to enter and occupy space previously occupied by the consumed fuel. While this simple venting arrangement is generally adequate, it does have several, sometimes dangerous, drawbacks. If the fuel tank is inadvertently inverted, fuel may drain out the venting aperture, creating a fire hazard. Even when the tank is in its normal attitude with the filler cap near the top thereof when the reservoir is completely filled with fuel, some fuel may be expelled through the venting aperture, for example due to expansion of the fuel when subjected to elevated temperatures, or fuel may on occasion spit from the venting aperture due to vibration of the tank or due to flexing of the tank side walls causing a temporary diminution of the tank volume.

Several prior art techniques have addressed the problem of the inadvertent expulsion of fuel from the fuel tank venting arrangement. For example, automotive fuel tanks have been provided with filler caps having a check valve in the fuel tank cap venting arrangement which check valve allows air to enter the tank but tends to close to prevent air or fuel from leaving the tank. Such a fuel tank cap is illustrated, for example, in U.S. Pat. No. 2,800,245 to Doyle et al.

Other prior art fuel tank caps have attempted to provide venting without fuel seapage by providing a series of baffles within the cap so that the air flow route into the cap is a serpentine path with no direct flow path from the cap vent hole into the tank. Typical of this approach is U.S. Pat. No. 3,140,794 to Arndt et al. There have been other generally more complex attempts at fuel tank venting arrangements but none have met with any significant commercial success. This lack of success may be traced to either excessive complexity and cost of the venting arrangement of failure of the venting arrangement to provide the desired results.

While the present invention may find use in a wide variety of environments it is especially suited to vented cap arrangements for fuel supply reservoirs associated with small internal combustion engines where simplicity and economy are key notes.

In the exemplary small internal combustion engine fuel reservoir environment, spitting or spurting of fuel from the fuel cap vent is frequently a direct result of fuel becoming trapped between baffles in that fuel cap and the cap vent hole. This trapping of fuel in turn has two frequent causes. If the fuel tank is full or nearly full, and then the fuel temperature increases, the fuel volume also increases, causing an overflow condition. The increase in fuel temperature may occur while the engine is running but be sufficient that the expansion rate exceeds the rate at which fuel is consumed by the engine. Another frequent cause of fuel being trapped in fuel cap baffling is "oil canning" of the fuel tank during engine operation. This flexing of the fuel tank walls creates a pumping action which, particularly when the tank is full or nearly full of fuel, forces fuel into the cap. Once baffle regions in the cap contain fuel, any additional pumping forces fuel to spurt out of the fuel cap vent opening with the severity of fuel spitting being a function of how full the tank is and how intensely it vibrates.

One attempt at preventing the spurting of fuel from the reservoir through the filler cap vent hole was to try to keep the fuel tank from vibrating, however, in the exemplary small internal combustion engine environment such tank vibration damping would require major modification to the tank and engine arrangement and would increase the cost of the assembly prohibitively.

SUMMARY OF THE INVENTION

Among the several objects of the present invention may be noted the provision of a vented fuel reservoir filler cap which minimizes fuel leakage in the event that the reservoir is inadvertently inverted; the provision of a fuel reservoir filler cap having a check valve and baffling in the air venting path; the provision of a spill and spit resistant fuel reservoir filler cap of the reservoir venting variety differing in the fewest possible aspects from conventional fuel reservoir caps; the provision of an insert for a fuel reservoir filler cap to render that cap spill and spit resistant; the provision of a spill and spit resistant fuel reservoir filler cap characterized by its ease and economy of manufacture; and the provision of a springless and simplistic check valve arrangement for a fuel reservoir filler cap. These as other objects and advantageous features of the present invention will be in part apparent and in part pointed out hereinafter.

In general a check valve for a fuel tank cap, to allow air to enter the tank while preventing the rapid egress of material from the tank, is provided in conjunction with a baffle arrangement disposed intermediate the check valve and a vent opening in the cap to obstruct the direct flow of material between the check valve and the aperture by providing a circuitous flow path only therebetween to reduce the probability of liquid fuel being expelled from the aperture.

Also in general and in one form of the invention, a check valve to be positioned intermediate a fuel reservoir filler cap inner surface and an annular gasket seated in the cap comprises a generally disc-like support with an elongated valve cavity member carried by the support and having openings near the opposite ends thereof. A valve member is captive within the valve cavity member and movable therein between a position near one cavity end for closing that end opening and a position near the other cavity end allowing that other cavity end to remain unobstructed. The filler cap is typically provided with a small air admitting aperture for venting the reservoir and a baffle may be disposed intermediate the aperture and the valve cavity member to provide only a tortuous flow path between the aperture and an opening of the valve cavity member. Additional baffling may also be provided.

BRIEF DESCRIPTION OF THE DRAWING

FIG. 1 is a perspective view of a fuel reservoir with a vented filler cap in its reservoir closing position;

FIG. 2 is a view in section along the lines 2—2 of FIG. 1, illustrating one form of the invention within the reservoir filler cap;

FIG. 3 is an exploded perspective view of the filler cap and check valve of FIG. 2; and FIG. 4 is an enlarged view in cross-section of the valve and valve cavity members of FIGS. 2 and 3.

Corresponding reference characters indicate corresponding parts throughout the several views of the drawing.

The exemplifications set out herein illustrate the invention in one form thereof and such exemplifications are not to be construed as limiting the scope of the disclosure or the scope of the invention in any manner.

DESCRIPTION OF THE PREFERRED EMBODIMENT

FIG. 1 illustrates generally a fuel reservoir 11 having a filler cap 13 in position thereon and with that filler cap 13 having a small aperture 15 generally centrally disposed therein for venting the fuel reservoir or tank 11. The tank 11 will typically have a fuel outlet line 17 for supplying fuel to, for example a small internal combustion engine. Vent opening 15 allows air to enter the reservoir to replenish the volume decrease within the tank due to the consumption of fuel.

The sectional view of FIG. 2 illustrates the removable fuel reservoir filler cap 13 in position and threadedly engaging the neck or filler portion 19 of the fuel reservoir 11. The check valve 21 is seen to be positioned intermediate the annular cap inner surface 23 and an annular gasket 25 which is seated in the cap 13 and in turn the gasket 25 and check valve 21 are seen to be captured between the gap inner surface 23 and the upper rim of the fuel reservoir filler or neck 19 when the cap is in the illustrated reservoir filler closing position. Check valve 21 includes a generally disc-like support 27 and an elongated valve cavity member 29 which is carried by the support 27 and which is illustrated in detail in FIG. 4. The valve cavity member 29 has openings 31 and 33 near opposite ends thereof and contains in a captive manner therein a valve member 35 which is movable between the position illustrated in FIG. 2 and the position illustrated in FIG. 4, where it should be remembered valve cavity member 29 is illustrated in an inverted position, as compared to FIG. 2. In the position illustrated in FIG. 4, valve member 35 closes the opening 31 while in the position illustrated in FIG. 2, the valve member 35 rides against apertured disc 37, best seen in FIG. 3, and does not close the opening 33. Thus, if the reservoir 11 is inadvertently inverted, the valve member or ball 35 assumes the position illustrated in FIG. 4 to minimize leakage by way of opening 31 from the reservoir. It should also be noted that the valve cavity member 29 has a generally conical interior surface 39 which converges toward and communicates with the opening 31 which the ball 35 engages in the position illustrated in FIG. 4. for closing the end opening 31. Configurations for valve member 35 other than the illustrated spherical configuration are of course possible, however, it is desirable that the valve member be made of a material more dense that the fluid so that upon reservoir inversion the valve member does assume the position illustrated in FIG. 4. In one preferred embodiment, ball 35 was made of Nylon.

Referring primarily to FIGS. 2 and 3, it will be noted that a baffle 41 is disposed intermediate the aperture 15 and the valve cavity member 29 so that a tortuous or circuitous flow path, as illustrated by the arrows such as 43, is the only path between the valve cavity member opening 31 and the aperture 15. A similar circuitous path for material flow, generally along arrows such as 45, is provided by a portion of the disc-like support 27 which defines baffle 47 having opening 49 near one corner thereof.

The baffles 41 and 47 define a series of chambers within the cap assembly with a first chamber 51 being defined between the support 27 and the baffle 4 while a second chamber 53 is defined between the cap 13 and the baffle 41 with of course a portion of the disc-like support 27 also forming a portion of chamber 53. Any fuel inadvertently entering chamber 53 may be prevented from leaking therefrom along the threaded engagement of neck 19 and cap 13 by providing a further annular gasket 55 intermediate the disc-like support 27 and the cap inner surface 33. A still further chamber 57 is formed between baffle 47 and the valve cavity member 29.

The path for air entry into the reservoir to compensate for the rate of decrease of fuel volume therein is seen to include in order, aperture 15, chamber 53, around baffle 41 into chamber 51, through opening 31 into the cavity of the valve cavity member 29, around the valve member 35 and exiting the valve cavity through openings 33 in disc 37, into chamber 57, and finally from that chamber 57 by way of opening 49 into the reservoir. This sequence is, of course, reversed for venting fuel vapors from the reservoir and is illustrated by the arrows, such as 45 and 43.

While the normal escape of vapors from the reservoir is insufficient to raise the valve member 35 from the position illustrated in FIG. 2, under "oil canning" or other spurt-creating conditions, fuel and/or air following the path of the arrows 43 and 45 may exert sufficient force on the valve member 35 to raise that valve member into its valve closing position, seating against the conical surface 39, thereby closing the fuel escape route. This type action where the force exerted on the ball 35 exceeds its weight substantially reduces the spitting or spurting of fuel from the aperture 15. From the foregoing it is now apparent that a novel vented, removable fuel reservoir filler cap arrangement including a baffled check valve for reducing fuel spurting, as well as minimizing leakage, if the reservoir is inadvertently inverted, has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. In combination with a removable fuel reservoir filler cap having a small generally centrally disposed air admitting aperture for venting the reservoir to generally balance the rate of decrease in fuel volume and the rate of increase of air volume within the reservoir, a check valve positioned intermediate a cap inner surface and an annular gasket seated in the cap with the gasket and check valve in turn captured between the cap inner surface and the fuel reservoir filler when the cap is in the reservoir filler closing position; the check valve comprising a generally disc-like support, an elongated valve cavity member carried by the support and having openings near opposite ends thereof, a valve member captive within the valve cavity member and movable therein between a position near one cavity end for closing the opening of said one cavity end and a position near the other cavity end whereby the cavity and valve member cooperate to allow air to enter the reservoir while precluding the rapid egress of material from the reservoir; a first baffle disposed intermediate the aperture and the check valve and carried by said support to obstruct direct material flow paths between the check valve and the aperture and provide bidirectional circuitous flow paths only between the check valve and the aperture; a second baffle formed by said support with a passage opening spaced below said valve cavity member, air entering the reservoir along a path defined in order by the aperture, the first baffle, the check valve, the second baffle and into the reservoir to thereby reduce the probability of liquid fuel being expelled from the aperture.

2. The combination of claim 1 wherein the filler is located near the uppermost portion of the reservoir and said valve member rests near the other cavity end when the reservoir is in its normal attitude, the valve member moving upward to the one cavity end to close the said one cavity end opening when the force exerted on the valve member by material passing through the cavity exceeds the weight of the valve member.

3. In combination with a fuel reservoir filler cap having a small air admitting aperture for venting the reservoir to balance generally the time rate of decrease in fuel volume and a time rate of increase of air volume within a reservoir, a first annular gasket seated in the cap against an inner surface thereof; a generally disc-like check valve support positioned in the cap adjacent the first gasket and including a chamber having a lower surface; a second annular gasket seated in the cap adjacent the check valve support with the first gasket, check valve support and second gasket captured in that order between the cap inner surface and the fuel reservoir filler when the cap is in the reservoir filler closing position; an elongated hollow valve cavity member carried by the check valve support and received in said chamber and having openings near opposite ends thereof and a generally conical interior surface portion converging toward and communicating with one end opening; a valve member of a material having a density greater than the density of the fuel to be contained in the reservoir captive within the valve cavity member and movable therein between a position near said one end opening seated in the generally conical interior surface and closing that one end opening, and a position near the other cavity end where the cavity and valve members cooperate to allow air to enter the reservoir, the valve member being normally urged by gravity toward said other cavity end, upward movement of fuel into the cap and toward the aperture forcing the valve member into engagement with the generally conical surface to close the one end opening and prevent the egress of fuel from the reservoir; said filler cap being provided with a small air admitting aperture for venting the reservoir to balance generally the rate of decrease in fuel volume and a rate of increase of air volume within the reservoir, said cavity member being spaced from the chamber lower surface to form a second chamber within said first mentioned chamber, said first mentioned and said second chambers having a common central axis; an opening in the lower surface of said second chamber offset from the central axis of said chambers to form a circuitous path for the fuel between the reservoir and the air admitting aperture comprising the offset opening, said second chamber, said valve member and said valve cavity member, said filler cap being located near the uppermost portion of the reservoir and the valve member being positioned near the other cavity end when the reservoir is in its normal attitude, inversion of the reservoir, allowing the valve member to move under the influence of gravity to said one end to close that one end opening and prevent fuel passage through the check valve.

4. The combination of claim 3 further comprising a baffle disposed intermediate the aperture and the valve cavity member to provide only a tortuous flow path between the aperture and an opening of the valve cavity member.

5. The combination of claim 3 further comprising a baffle integral with the check valve support and partially obscuring the opening at the valve cavity other end to provide a circuitous path only between the reservoir and the valve member.

6. The combination of claim 3 further including a first baffle disposed intermediate the aperture and the valve cavity member, the path for air to enter the reservoir being defined in order by the aperture, about the first baffle by a circuitous route, through the valve cavity member, and around the offset opening into the reservoir.

* * * * *